United States Patent
Hwang

(10) Patent No.: US 9,137,394 B2
(45) Date of Patent: Sep. 15, 2015

(54) SYSTEMS AND METHODS FOR OBTAINING A RESOURCE

(75) Inventor: Peter G. Hwang, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 308 days.

(21) Appl. No.: 13/085,919

(22) Filed: Apr. 13, 2011

(65) Prior Publication Data

US 2012/0262754 A1    Oct. 18, 2012

(51) Int. Cl.
*G06F 3/12*    (2006.01)
*H04N 1/00*    (2006.01)
*H04N 1/32*    (2006.01)

(52) U.S. Cl.
CPC ....... *H04N 1/00212* (2013.01); *H04N 1/00228* (2013.01); *H04N 1/00233* (2013.01); *H04N 1/32128* (2013.01); *H04N 2201/0082* (2013.01); *H04N 2201/3222* (2013.01); *H04N 2201/3226* (2013.01); *H04N 2201/3278* (2013.01)

(58) Field of Classification Search
CPC .......... H04N 1/00212; H04N 1/00374; H04N 1/00376; H04N 1/00228
USPC ........................... 358/1.1–3.29; 709/201–226
See application file for complete search history.

(56) References Cited

U.S. PATENT DOCUMENTS

| | | |
|---|---|---|
| 6,029,182 A | 2/2000 | Nehab et al. |
| 6,975,419 B2 | 12/2005 | Staas et al. |
| 7,065,497 B1 | 6/2006 | Brewster et al. |
| 7,225,401 B2 | 5/2007 | Purvis |
| 7,249,319 B1 | 7/2007 | Payne et al. |
| 7,290,285 B2 | 10/2007 | McCurdy et al. |
| 7,302,423 B2 | 11/2007 | De Bellis |

(Continued)

FOREIGN PATENT DOCUMENTS

| | | |
|---|---|---|
| CN | 101329687 A | 12/2008 |
| CN | 102073728 A | 5/2011 |

(Continued)

OTHER PUBLICATIONS

Merrill, S., Read Any RSS Feed on Your Lexmark All-in-one Printer, (Web Page), Jul. 6, 2010, http://techcrunch.com/2010/07/06/read-any-rss-feed-on-your-lexmark-all-in-one-printer/.

(Continued)

*Primary Examiner* — Marcellus Augustin
(74) *Attorney, Agent, or Firm* — Tarolli, Sundheim, Covell & Tummino LLP

(57) ABSTRACT

One example discloses a network system for obtaining a network resource for printing. The network system can comprise a system comprising a memory for storing computer executable instructions and a processing unit for accessing the memory and executing the computer executable instructions. The computer executable instructions can comprise a server comprising a message analyzer. The message analyzer can receive a list of network resources based on a network search executed for query data included in a query print message received at the server. The message analyzer can also select a network resource from the list of network resources that is determined to be a best match for the message to provide a selected resource. The server can manipulate the selected resource into a format for printing to provide a manipulated resource.

11 Claims, 5 Drawing Sheets

(56) References Cited

U.S. PATENT DOCUMENTS

| | | | |
|---|---|---|---|
| 7,386,791 B2 | 6/2008 | Jacobson | |
| 7,565,350 B2 | 7/2009 | Fetterly et al. | |
| 7,617,446 B2 | 11/2009 | Dutta | |
| 7,711,747 B2 | 5/2010 | Renders et al. | |
| 7,720,835 B2 | 5/2010 | Ward et al. | |
| 7,769,751 B1 | 8/2010 | Wu et al. | |
| 7,861,165 B2 | 12/2010 | Stevenson | |
| 7,996,000 B1 | 8/2011 | Dubinko et al. | |
| 8,020,090 B2 | 9/2011 | Chen et al. | |
| 8,046,681 B2 | 10/2011 | Vydiswaran et al. | |
| 8,479,092 B1 | 7/2013 | Pandey | |
| 8,593,666 B2 | 11/2013 | Xiao | |
| 8,645,369 B2 | 2/2014 | Poblete et al. | |
| 8,683,379 B2 | 3/2014 | LuVogt et al. | |
| 8,713,438 B1 | 4/2014 | Broniek et al. | |
| 8,745,091 B2 | 6/2014 | McHenry et al. | |
| 2002/0078045 A1 | 6/2002 | Dutta | |
| 2002/0123988 A1 | 9/2002 | Dean et al. | |
| 2003/0142801 A1* | 7/2003 | Pecht | 379/100.01 |
| 2003/0210424 A1 | 11/2003 | Sandfort et al. | |
| 2004/0185882 A1 | 9/2004 | Gecht et al. | |
| 2004/0249934 A1* | 12/2004 | Anderson et al. | 709/224 |
| 2004/0252332 A1 | 12/2004 | McCoog et al. | |
| 2005/0120311 A1 | 6/2005 | Thrall | |
| 2005/0138065 A1* | 6/2005 | Ciriza | 707/104.1 |
| 2005/0154718 A1 | 7/2005 | Payne et al. | |
| 2006/0033950 A1 | 2/2006 | Nakamura | |
| 2006/0048053 A1 | 3/2006 | Sembower et al. | |
| 2006/0123114 A1 | 6/2006 | Aoki et al. | |
| 2006/0125820 A1 | 6/2006 | Turcan et al. | |
| 2006/0143286 A1 | 6/2006 | Aoki et al. | |
| 2006/0167862 A1 | 7/2006 | Reisman | |
| 2006/0173985 A1 | 8/2006 | Moore | |
| 2006/0277482 A1 | 12/2006 | Hoffman et al. | |
| 2007/0027932 A1 | 2/2007 | Thibeault | |
| 2007/0047844 A1 | 3/2007 | Watanabe et al. | |
| 2007/0130509 A1 | 6/2007 | Gombert et al. | |
| 2007/0174298 A1 | 7/2007 | Tanimoto | |
| 2007/0220411 A1 | 9/2007 | Hauser | |
| 2007/0247664 A1 | 10/2007 | Yamamoto | |
| 2008/0005250 A1 | 1/2008 | Oksum | |
| 2008/0005651 A1 | 1/2008 | Grefenstette et al. | |
| 2008/0030775 A1* | 2/2008 | Adachi et al. | 358/1.15 |
| 2008/0046459 A1 | 2/2008 | Hinohara | |
| 2008/0068650 A1 | 3/2008 | Negoro | |
| 2008/0089709 A1 | 4/2008 | Higashi | |
| 2008/0097828 A1 | 4/2008 | Silverbrook et al. | |
| 2008/0147514 A1 | 6/2008 | Shuster et al. | |
| 2008/0307308 A1 | 12/2008 | Sullivan et al. | |
| 2009/0002770 A1* | 1/2009 | Cavill et al. | 358/402 |
| 2009/0013071 A1 | 1/2009 | Matoba et al. | |
| 2009/0030889 A1 | 1/2009 | Chatow et al. | |
| 2009/0119260 A1 | 5/2009 | Chopra et al. | |
| 2009/0171751 A1 | 7/2009 | Zhou et al. | |
| 2009/0310168 A1* | 12/2009 | Kunioka et al. | 358/1.15 |
| 2009/0316198 A1 | 12/2009 | Takeuchi et al. | |
| 2010/0069116 A1 | 3/2010 | Silverbrook et al. | |
| 2010/0145955 A1 | 6/2010 | McDonald et al. | |
| 2010/0281351 A1 | 11/2010 | Mohammed | |
| 2010/0328725 A1 | 12/2010 | Gaucas et al. | |
| 2011/0040823 A1 | 2/2011 | Liu et al. | |
| 2011/0078558 A1 | 3/2011 | Bao et al. | |
| 2011/0213894 A1 | 9/2011 | Silberstein et al. | |
| 2011/0235088 A1* | 9/2011 | Luo | 358/1.15 |
| 2012/0011021 A1 | 1/2012 | Wang et al. | |
| 2012/0062935 A1 | 3/2012 | Kamath et al. | |
| 2012/0212772 A1 | 8/2012 | Hwang et al. | |
| 2012/0262754 A1 | 10/2012 | Hwang | |
| 2013/0010333 A1 | 1/2013 | Anand et al. | |
| 2013/0103461 A1 | 4/2013 | Bhatia | |
| 2013/0185364 A1 | 7/2013 | Bhatia | |
| 2013/0222843 A1 | 8/2013 | Ganesan et al. | |
| 2014/0036303 A1 | 2/2014 | Vishwanath et al. | |
| 2014/0057238 A1 | 2/2014 | Okamoto et al. | |
| 2014/0122486 A1 | 5/2014 | Simard et al. | |
| 2014/0214632 A1 | 7/2014 | Garera et al. | |

FOREIGN PATENT DOCUMENTS

| | | |
|---|---|---|
| CN | 102253937 A | 11/2011 |
| EP | 0986213 | 5/2000 |
| WO | WO-2013048428 A1 | 4/2013 |
| WO | WO-2013159246 A1 | 10/2013 |

OTHER PUBLICATIONS

SPCURTIS81, "App Idea—Select Your Own RSS Feed for Scheduled Printing," HP Support Forums, Jul. 26, 2012, <http://h30434.www3.hp.com/t5/ePrint-Print-Apps-Mobile-Printing-and-ePrintCenter/App-Idea-Select-Your-Own-RSS-Feed-For-Scheduled-Printing/td-p/1700391>.

Wikipedia, "Delicious (website)," Jun. 4, 2012, <http://web.archive.org/web/20120604165352/https://en.wikipedia.org/wiki/Delicious_(website)>.

Wikipedia, "Google bookmarks," Mar. 7, 2012, <http://web.archive.org/web/20120307041604/http://en.wikipedia.org/wiki/Google_Bookmarks>.

Luo, P. et al., "Web Article Extraction for Web Printing: a DOM+Visual based Approach," Hewlett-Packard Company, 9th ACM Symposium on Document Engineering, 2009.

Tsukada, M. et al., "Automatic Web-Page Classification by Using Machine Learning Methods," Web Intelligence: Research and Development, Springer Berlin Heidelberg, 2001, pp. 303-313, available at http://www.ar.sanken.osaka-u.ac.jp/papers/2006-12/wi01_tsukada.pdf.

International Search Report & Written Opinion received in PCT Application No. PCT/CN2012/000569, Feb. 7, 2013, 6 pages.

Chen, Y. et al., "Improve on Frequent Access Path Algorithm in Web Page Personalized Recommendation Model," (Research Paper), International Conference on Information Science and Technology (ICIST), Mar. 2011, 4 pages, found at http://ieeexplore.ieee.org/stamp/stamp.jsp?arnumber=5765216.

Wikipedia, "Machine learning," Oct. 24, 2014, <http://en.wikipedia.org/wiki/Machine_learning>. pp. 1-12.

Yu, B. et al., "Video Summarization Based on User Log Enhanced Link Analysis," (Research Paper), 11th ACM International Conference on Multimedia, 2003, 2 pages, found at http://dl.acm.org/citation.cfm?id=957013.957095&coll=DL&dl=GUIDE&CFID=89676494&CFTOKEN=29375123.

Printable Web Pages on the Fly! (Web Page) http://www.printer-friendly.com/2008011945/java/web2printer.html.

Written Opinion received in PCT Application No. PCT/CN2012/000569, Feb. 7, 2013, 6 pages.

* cited by examiner

SYSTEMS AND METHODS FOR OBTAINING A RESOURCE

BACKGROUND

Cloud computing is location-independent computing, whereby shared servers provide resources, software, and data to computers and other devices on demand. The term "cloud" is used as a metaphor for the Internet, based on the cloud drawing often used to represent computer networks. Cloud computing describes a supplement, consumption, and delivery model for information technologies services based on the Internet, and can involves over-the-Internet provision of dynamically scalable and often virtualized resources. One key characteristic of cloud computing is that the computing is "in the cloud" e.g. the processing (and the related data) is not in a specified, known or static place(s). Details are abstracted from consumers, who no longer have need for expertise in, or control over, the technology infrastructure "in the cloud" that supports them. This is in contrast to a model in which the processing takes place in one or more specific servers that are known.

In some examples of cloud computing, one or more of the aforementioned resources can include a printer, which can be referred to as a cloud printer. In such a situation, nearly any computing device connected to the computing cloud can print to the cloud printer.

DETAILED DESCRIPTION

Figure 1:
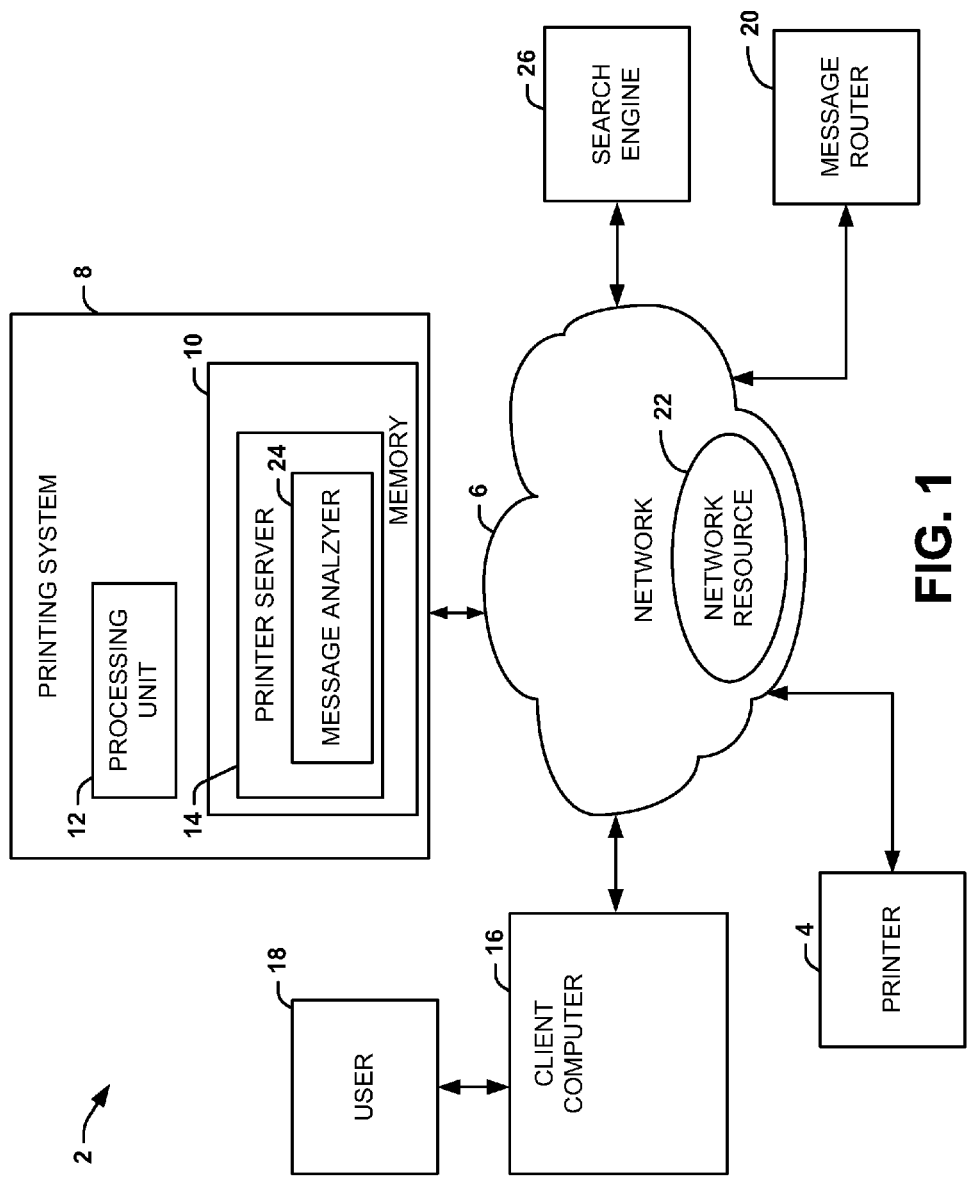
FIG. 1 illustrates an example of a network system for obtaining a network resource for printing.

FIG. 1 illustrates an example of a network system 2 for obtaining a network resource for printing. The network system 2 could be implemented, for example, as a computing cloud. A printer 4 can be connected to a network 6. The network 6 can be implemented, for example, as the Internet. Nodes on the network 6 can communicate via a communications protocol, such as Transmission Control Protocol/Internet Protocol (TCP/IP), Internet Protocol version 6 (IPv6), etc. The printer 4 can be implemented as a cloud printer, wherein the printer 4 can be assigned a node address (e.g., an IP address) on the network 6. In other examples, the printer 4 could be connected to a communications port (e.g., a USB port) of a network node that is assigned a node address, where certain messages destined for the network node are passed and/or formatted for the printer 4. The printer 4 can be registered with a printing system 8.

For purposes of simplification of explanation, in the present example, different components of the network system 2 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributing among remote devices across the network 6 (e.g., external web services).

The printing system 8 can include, for example, a memory 10 for storing computer executable instructions. The printing system 8 can also include, for example, a processing unit 12 (e.g., a processor core) for accessing the memory 10 and executing the computer executable instructions. The memory 10 can include a printer server 14. As described herein, the printer server 14 can route print jobs to the printer 4 based on a received message. The printer server 14 can send network messages to the printer 4. The network messages can cause a printer 4 to process a print job (e.g., print a document). The network messages can include a payload that provides commands to the printer 4 in a protocol native to the printer 4, which can be referred to as an instruction message. For instance, the instruction message can include printer command language (PCL) commands, portable document format (PDF) commands, HEWLETT PACKARD® Graphics Language (HPGL), commands, etc. To provide the instruction message, the printer server 14 can include a printer driver for the printer 4. In some examples, the printer driver for the printer 4 could be provided to the printer server 14 from an external system (e.g. a web service).

The network system 2 can include a client computer 16 that can be implemented, for example, as a system that can send a message to the printer server 14 over the network 6. The message can be generated, for example, by a user 18 of the client computer 16. The client computer 16 could be implemented, for example, as a mobile device (e.g., a mobile phone) that can send short message service (SMS) messages to the printer server 14. In other examples, the client computer 16 could be implemented as a computer system, such as a tablet, a smart phone, an interactive television set, an Internet appliance, a laptop or a desktop computer that can send email messages, SMS messages, Tweets™, etc. to the printer server 14. For purposes of simplification of explanation, each of an SMS message, an email message and a Tweet™ can be referred to collectively as simply a message. Messages sent between the client computer 16 and the printer server 14 can be routed for example through a message router 20. The message router 20 could be implemented, for example, as an email server, an SMS router, etc. In such a situation, the printer 4 and/or the printer server 14 can be assigned an SMS address (e.g., a telephone number) and/or an email address, and messages addressed to the SMS address and/or the email address of the printer 4 can be routed to the printer server 14. Moreover, although only one message router 20 is illustrated in FIG. 1, it is to be understood that the message router 20 could be representative of a plurality of message routers. Further, in some examples, the message router 20 could be implemented in the printing system 8.

In some examples, the user 18 can be registered with the printer server 14. In such a situation, the user 18 can have preferences registered with the printer server 14. For instance, the preferences can designate that a particular type of print job (e.g., a color photo and/or text document) be routed to a particular printer 4.

As one example, the printer server 14 can receive a message requesting (i) a network search, and (ii) a print of content from the network 6 based on the network search, which message can be referred to as a query print message. The content can be implemented, for example, as a network resource 22 on the network 6, such as a webpage, a portable document format (PDF) file, a text document (e.g., a word processor document), etc. As one example, the query print message can include data structured as a query for search engine of the World Wide Web (WWW), which data can be referred to as query data.

Figure 2:
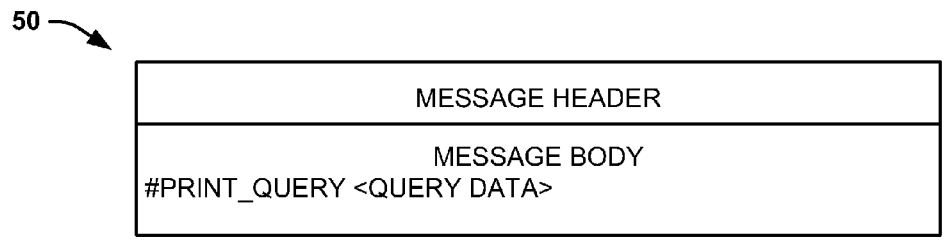
FIG. 2 illustrates an example of a query print message.

FIG. 2 illustrates an example of a query print message 50 that could be employed as the query print message illustrated in FIG. 1. The query print message 50 can include a message header (labeled in FIG. 2 as "MESSAGE HEADER") that can include routing information that identifies the sender of the query print message 50 and the recipient of the query print message 50. In some examples, the recipient of the query print message 50 identified in the message header could be a printer server or a printer. Moreover, the structure of the message header can vary based on the particular implementation of the query print message 50. For instance, an SMS message being employed as the query print message 50 could have a different message header that an email message being employed as the query print message 50.

The query print message 50 can also include a message body (labeled in FIG. 2 as "MESSAGE BODY"). In some examples, the message body could additionally or alternatively be incorporated as part of the message header (e.g., in a subject field of the message header). The message body can include a request identifier implemented as a pound symbol ("#"), but it is to be understood that other symbols could be employed as well. Moreover, in some examples, the request identifier could be omitted. Following the message identifier, a print query request can be included (labeled in FIG. 2 as "PRINT_QUERY"). The print query request can indicate a request that a network search employing query data (labeled in FIG. 2 as "QUERY DATA") be executed, and that the results of the query be printed.

Referring back to FIG. 1, a message analyzer 24 of the printer server 14 can extract the query data from the query print message. The message analyzer 24 can employ the query data to generate a query (e.g., a web search) based on the query data. In some examples, the message analyzer 24 can be designed as a search engine 26, and can execute a search of the network 6. In other examples, the message analyzer 24 can collaborate with an external system, such as a search engine 26 to perform a search of the network 6. In such a situation, the message analyzer 24 can forward the query data to the external system, and the external system can return results of the search of the network 6.

The results of the search can be implemented, for example, as the network resource 22 from the network 6. The content can include, for example, a list of network resources (e.g., web pages, documents, etc.) that are the most likely to contain information desired as indicated by the query data of the query print message. For instance, in a situation where the message analyzer 24 collaborates with an external system to execute a search of the network 6, the external system could return a list of ten network resources that most likely contain information desired based on the query data of the query print message. In some examples, the results can be based on autocorrections made by the search engine 26 and/or the printer server 14. In other examples, the results of the search could return no results (e.g., in situations where the query data included misspellings).

Upon receiving the results of the network search, the message analyzer 24 can select a network resource determined to be the best match for the query print message based on the query data, which network resource can be referred to as a selected resource. In some examples, the message analyzer 24 can select multiple network resources and merge the multiple network resources into a single resource. For instance, in response to a request for a windsurfing report, the message analyzer 24 could merge network resources associated with a weather report, a local events calendar, tide conditions, etc. The determination can be based, for example, on a review of similar network searches. For instance, in some examples, the printer server 14 can provide the client computer 16 with a list of possible network resources based on the query data, where the user 18 can select one or more network resources from the list of possible network resources, and that network resource can be printed. In such a situation, the printer server 14 can record the selection choice made by the user 18. Thus, after many such queries, the message analyzer 24 can accurately predict the selection made by the user 18. As an example, if the same selection choice is made by a certain percentage of users (e.g., about 80%) for a same or similar network search, the printer server 14 can be designed to presume that such a selection choice would also be made by the user 18 for the query print message. Accordingly, in the present example, no interaction between the printer server 14 and the user 18 is needed after the query print message is received at the printer server 14. Instead, the printer server 14 can automatically select and store the network resource (the selected resource) from the list of network resources that most likely matches the request made in the query print message (e.g., a best match).

In some examples, the message analyzer 24 may be unable to determine from the list of network resources the best match for the query print message. In such a situation, the message analyzer 24 can provide a response message to the client computer 16. For instance, in situations where the results of the search produce no results (e.g., empty set), the message analyzer 24 can provide the client computer 16 with the response message implemented as a denial message indicating that no results for the query data were found. In other examples, in situations where two or more of the network resources in the list of network resources have an equal or substantially equal chance of being the best match for the query print message and/or no single network resource from the list of network resources has a high likelihood (e.g., at least about 80%) of being the best match for the query print message, the message analyzer 24 can provide the client computer 16 with the response message implemented as a clarification message. The clarification message can, for example, indicate that further narrowing of the search executed based on the query data is needed. In such a situation, the user 18 of the client computer 16 can submit a new query print message that includes more specific parameters set forth in query data.

In situations where the printer server 14 can determine the most likely best match for the query print message, the printer server 14 can employ the selected resource and manipulate the selected resource into a format suitable for printing to provide a manipulated resource. Such a manipulation can include, for example, rearranging the selected resource and/or selecting a proper subset of the selected resource that is suitable for printing. For instance, some network resources can include extraneous data (e.g., advertisements, legal disclosures, etc.) that might be undesirable for printing. In such a situation, the manipulation of the selected resource can include omission of such extraneous data in the format suitable for printing. Moreover, the printer server 14 can generate a set of commands for the printer based on printing preferences for the user 18 to print the manipulated resource. The printer server 14 can provide the set of commands as the aforementioned instruction message to the printer 4.

In response to the instruction message, the printer 4 can execute the set of commands included in the instruction message to execute a print job. The printer 4 can provide the printer server 14 with a status message indicating the status of the print job. For instance, if the printer 4 completes the print job, the status message can indicate that the print job has been completed. In another example, if the printer 4 fails to complete the print job (e.g., the printer 4 runs out of paper), the status message can indicate that the print job has not been completed, and a reason for the incompletion. Based on the status message, the printer server 14 can provide an update message to the client computer 16. For instance, the update message can include information that indicates that a print job corresponding to the request made in the query print message has been completed, as well as an identification of the printer 4 that executed the print job. Alternatively, the update message can include information that indicates that the print job has not been completed, and the reason for the incompletion (e.g., printer 4 out of paper), such that the user 18 can remedy the situation (e.g., load paper at the printer 4).

By utilizing the network system 2, the client computer 16, from which the query print message originated does not need to include a printer driver for the printer 4, but is not prohibited from having such a printer driver. Moreover, the client computer 16 does not need to include a display capable of displaying graphical images (e.g. pictures) in order for the user 18 to be able to print network resources from the network 6. Furthermore, the client computer 16 does not need to include a browser (e.g., a web browser) to obtain network resources from the network 6. Still further, the user 18 does not need to have access to a graphical user interface (GUI) to format a network resource for printing. Instead, the client computer 16 needs only to include a system for contacting the printer server 14 (e.g., an SMS system, an email client, a Twitter™ application, etc.).

As some examples, the query data of the query print message could be implemented as a request for a particular recipe, a request for repair instructions, driving directions, answers to trivia questions, etc. In each of these situations, the printer server 14 and the message analyzer 24 can retrieve network resources from the network 6, select which network resource most likely fulfills the user's 18 intent for a printed document, format a selected resource into an appropriate form for printing, and send an instruction message to a printer 4 causing the printer 4 to print the selected resource for the user 18. In some situations, the user 18 may not receive desirable results. For instance, if the query data in a query print message is "recipe kung-pow chicken," but the user 18 is allergic to peanuts, and the recipe printed by the printer 4 has peanuts, the user 18 can simply submit a new query print message with more specific query data (e.g. "recipe kung-pow chicken no peanuts"). The network system 2 can provide great flexibility to the user 18, particularly in situations where the user 18 does not have access to a fully resourced computer.

Figure 3:
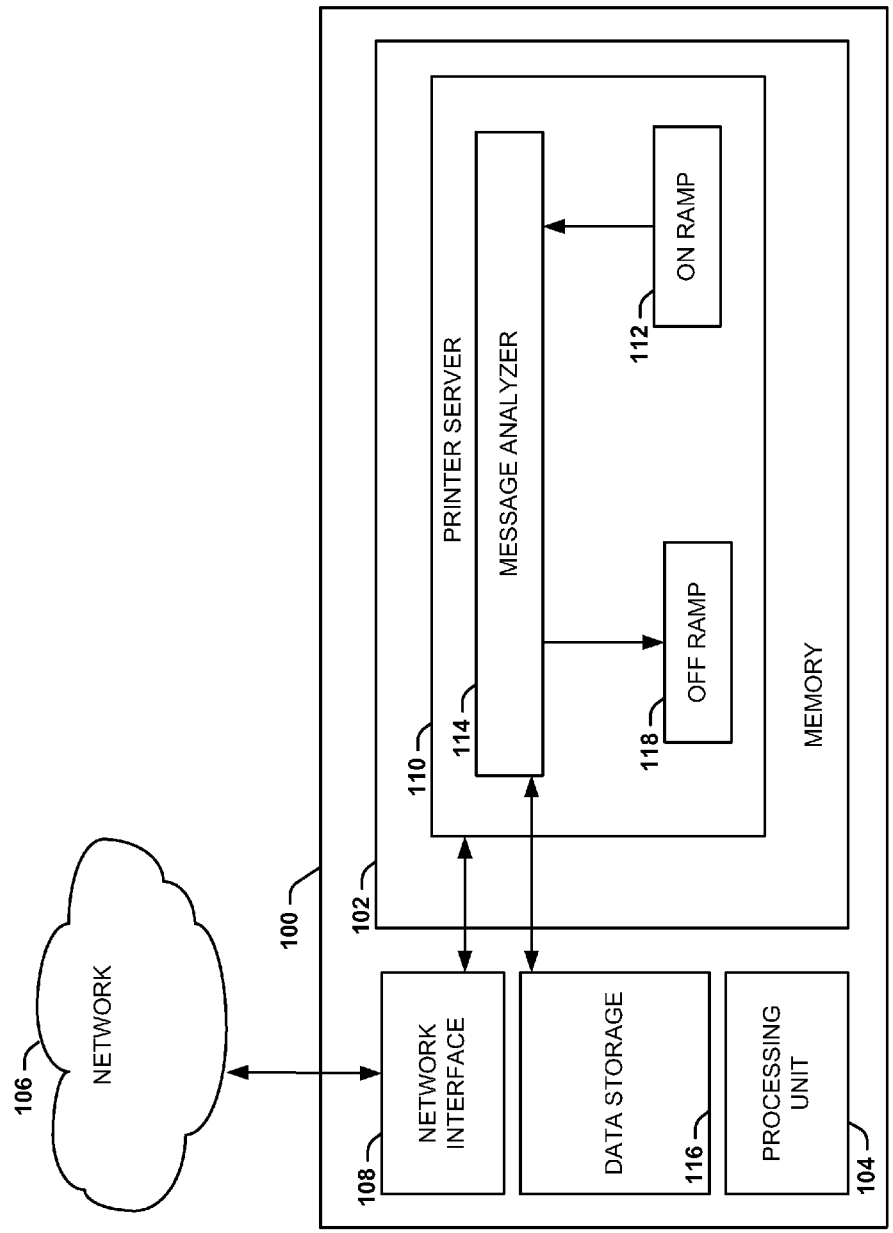
FIG. 3 illustrates an example of a printing system for obtaining a network resource for printing.

FIG. 3 illustrates an example of a printing system 100 that can be utilized to implement, for example, the printing system 8 illustrated in FIG. 1. The printing system 100 can include a memory 102 for storing computer executable instructions. The memory 102 could be implemented, for example, as random access memory, flash memory, a hard disk, a combination thereof, etc. The printing system 100 can also include a processing unit 104 that can access the memory 102 and execute computer executable instructions. The processing unit 104 can be implemented, for example, as a processor core.

The printing system 100 can be coupled to a network 106 (e.g., the Internet) via a network interface 108, which could be implemented as a network interface card. The memory 102 can include a printer server 110 that can manage print jobs.

The printer server 110 can include an on ramp 112 that receives a message with query data. The on ramp 112 can examine the message to determine if the message contains a request identifier and a request for (i) a network search of the network 106 based on the query data and (ii) a print job based on the network search, where such a message can be referred to as a query print message. The on ramp 112 can provide the query print message to a message analyzer 114 of the printer server 110. The message analyzer 114 can evaluate a destination address (e.g., addressee) of the query print message and retrieve a printer record from a data storage 116 of the printing system 100 associated with the destination address of the query print message, wherein the printer can be referred to as an identified printer. Moreover, in some examples, the message analyzer 114 can retrieve printing preferences from the data storage 116 based on a sender address of the query print message. The printing preferences can, for example, identify printing preferences for the user and/or identify the identified printer. The data storage 116 can include, for example, a database and/or a table that can store the printer record and/or the printing preferences. The data storage 116 can be implemented, for example as volatile memory (e.g., RAM) or non-volatile memory (e.g. a hard disk and/or a flash drive). The printer record can include routing information (e.g., a network address) associated with the identified printer.

The message analyzer 114 can analyze the query print message to extract query data. The message analyzer 114 can employ the query data to facilitate a search of the network 106, which search can be referred to as a network search. The network search can be performed, for example, by the message analyzer 114, and/or in collaboration with a search engine of an external system. A list of network resources based on the results of the network search corresponding to content available on the network 106 can be examined by the message analyzer 114. If the message analyzer 114 can determine a most likely best match in the list of results for the user based on the query data of the query print message, referred to as a selected resource, the message analyzer 114 can retrieve the selected resource from the network 106, and forward the selected resource to an off ramp 118 of the printer server 110.

If the message analyzer 114 is unable to determine a most likely best match due to a lack of network resources return based on the network search (e.g., due to misspellings), the message analyzer 114 can provide the sender of the query print message a denial message that indicates that no network resources for the query data have been found. In another example, if the message analyzer 114 is unable to determine the most likely best match due to at least two different network resources of the list of network resources having an equal (or near equal) chance of being the best match and/or if no single network resource from the list of network resources has a high likelihood (e.g., at least about 80%) of being the best match for the query print message, the message analyzer 114 can provide a clarification message to the sender of the query print message. The clarification message can request that the sender of the query print message provide more specificity in the query print data.

In response to receiving the selected resource, the off ramp 118 can manipulate the selected resource into a format suitable for printing, which can be referred to as a manipulated resource. Moreover, the off ramp 118 can convert the manipulated resource into a set of commands executable by the identified printer (e.g., PCL, PDF, HPGL, etc.). In some examples, the off ramp 118 can access external systems (e.g., web services) to facilitate the generation of the set of commands. The off ramp 118 can send the set of commands as an instruction message to the identified printer over the network 106, thereby causing the identified printer to process the set of commands. The processing of the set of commands can result, for example, in an execution of the print job. The execution of the print job can include, for example, printing the manipulated resource.

The off ramp 118 can receive a status message from the identified printer. The status message could indicate, for example, whether or not the identified printer has completed a print job based on the instruction message. In response to the status message, the off ramp 118 can provide an update message (e.g., an email or an SMS message) to the sender of the query print message that reports the results of the status message. Thus, the update message provides the sender of the query print message an indication of a status of the print job corresponding to the execution of a print job requested by the query print message.

Figure 5:
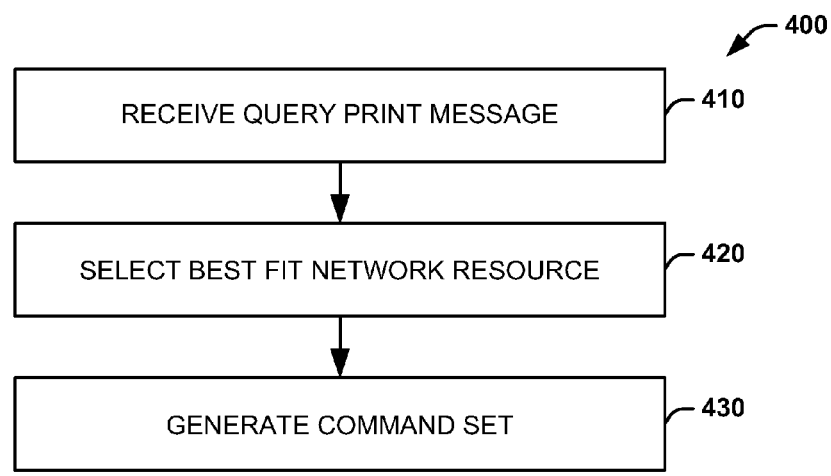
FIG. 5 illustrates another example of a flowchart of a method for obtaining a network resource for printing.
Figure 4:
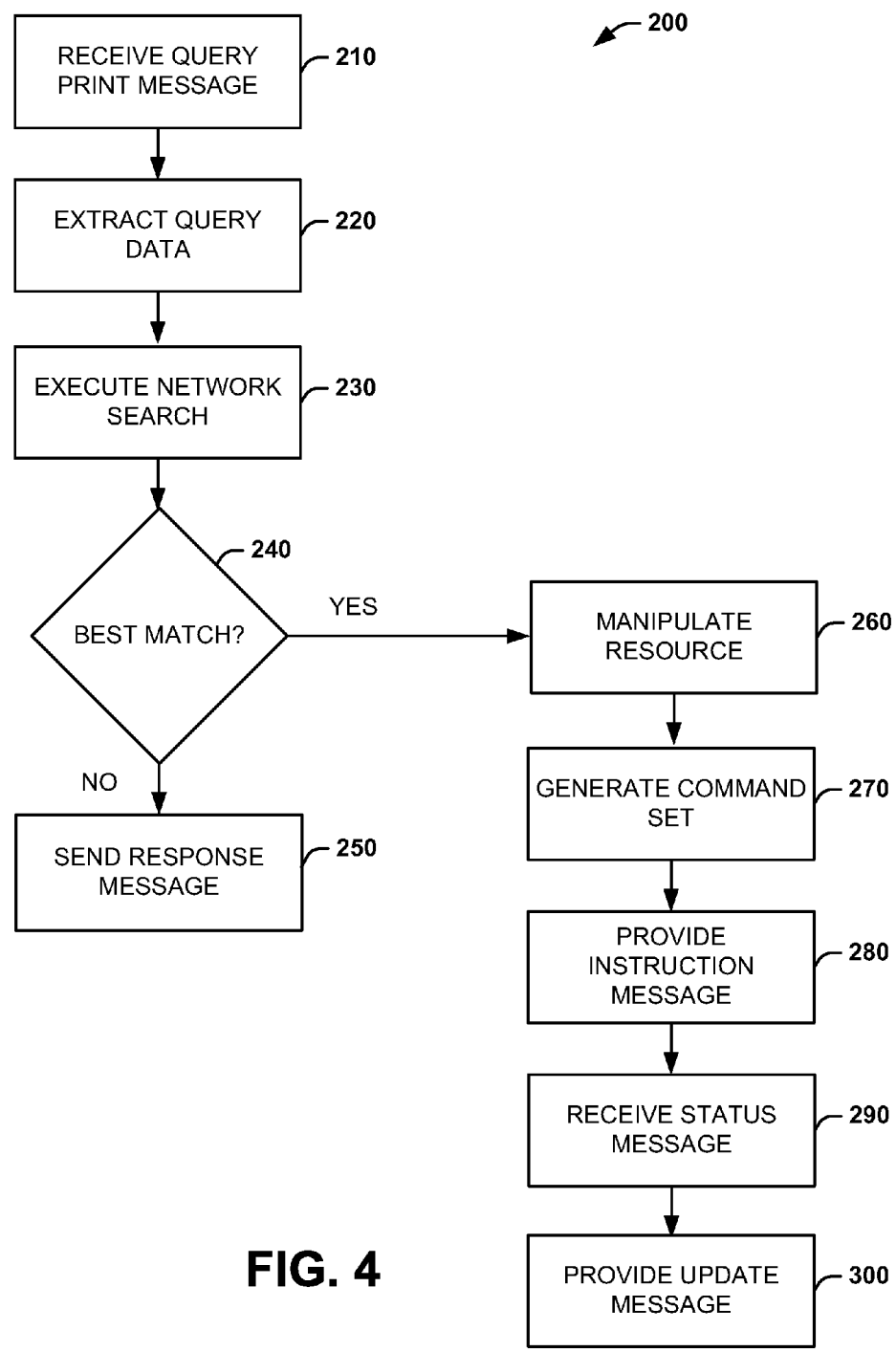
FIG. 4 illustrates an example of a flowchart of a method for obtaining a network resource for printing.

In view of the foregoing structural and functional features described above, example methods will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 4 illustrates a flow chart of an example method 200 for managing a print job. The method 200 could be executed, for example, by a printing system (e.g., included in the network system 2 illustrated in FIG. 1 and/or the printing system 100 illustrated in FIG. 3). At 210, a query print message can be received at a printer server of the printing system. At 220, query data can be extracted from the query print message. At 230, a search of a network can be executed based on the query data of the query print message. At 240, a determination can be made as to whether a best match for the query print message has been found from a list of network resources returned from the execution of the network search. If the determination at 240 is negative (e.g., NO), the method 200 can proceed to 250. If the determination is positive (e.g., YES), the method 200 can proceed to 260. At 250, a response message is provided to the sender of the query print message. The response message can be implemented, for example, as a denial message, for example, if no network resources are returned from the execution of the search. Alternatively, the response message can be implemented as a clarification message, for example, if at least two different network resources have substantially the same likelihood of being a best match for the query print message and/or if no single network resource has a high likelihood (e.g., at least about 80%) of being the best match for the query print message.

At 260, the network resource corresponding to the best match for the query print message can be manipulated into a format suitable for printing. The manipulation can include, for example, rearranging features of the network resource and/or selecting a proper subset of the features in the network resource for printing. At 270, a command set can be generated based on the manipulated resource. For instance, the manipulated resource can be converted, by the printing system, into a set of commands in a protocol native to a printer (e.g., PCL, PDF, HGPL, etc.) identified in the query print message and/or a printer associated with printing preferences of the sender of the query print message. At 280, an instruction message including the commands can be provided to the printer from the printer server. At 290, the printer server can receive a status message from the identified printer. The status message can indicate whether the print job has been executed. At 300, the printer server can provide an update message (e.g., an email message, an SMS message, a Tweet™, etc.) to the sender of the query print message based on information in the status message. By utilization of the method 200, a user of a client system (e.g., the sender of the query print message) can print network resources from the network (e.g., the Internet) even if the client system does not include a web browser and/or a graphical display. Moreover, the client system does not need to include a driver for the printer. Accordingly, the client system can leverage and print network resources from the network with a very simple client system (e.g., a client system with a monochrome and/or small display).

FIG. 5 illustrates another flowchart of an example method 400 for obtaining a network resource for printing. At 410, a query print message that includes query data can be received. The query print message can include query data. At 420 a selected resource can be selected from a list of network resources returned from a network search based on the query data. The selected resource can be a network resource that corresponds to a best match for the query print message. At 430, a command set can be generated based on the selected resource for a printer associated with a sender of the query print message.

Figure 6:
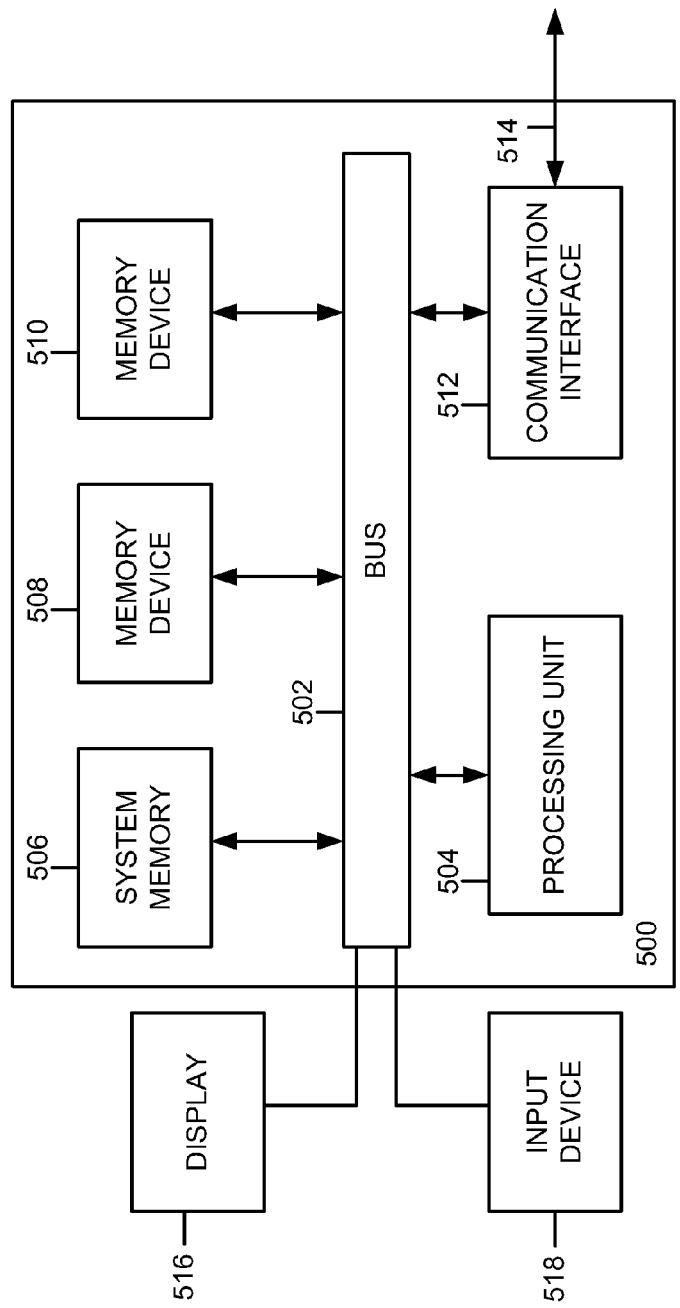
FIG. 6 illustrates an example of a computer system that can be employed to implement the systems and methods illustrated in FIGS. 1-5.

FIG. 6 is a schematic block diagram illustrating an example system 500 of hardware components capable of implementing examples disclosed in FIGS. 1-5, such as the printing system 8, the client computer 16, and portions of the of printer 4 illustrated in FIG. 1 and/or the printing system 100 illustrated in FIG. 3. The system 500 can include various systems and subsystems. The system 500 can be a personal computer, a laptop computer, a workstation, a computer system, an appliance, an application-specific integrated circuit (ASIC), a server, a server blade center, a server farm, a mobile device, such as a smart phone, a personal digital assistant, an interactive television set, an Internet appliance, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand alone database, or other non-volatile memory, can also be in communication with the system bus 502. The system bus 502 operably interconnects the processing unit 504, the memory devices 506-510, the communication interface 512, the display 516, and the input device 518. In some examples, the system bus 502 also operably interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processor core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio.

Additionally, the memory devices 508 and 510 can serve as databases or data storage such as the data storage 116 illustrated in FIG. 3. Additionally or alternatively, the system 500 can access an external system (e.g., a web service) through the communication interface 512, which can communicate with the system bus 502 and the communication link 514.

In operation, the system 500 can be used to implement, for example, a client computer, a printer server, and at least some components of printers the can be employed in a system that obtains a network resource for printing. Computer executable logic for implementing the system, such as the memory 10 of the printing system 8 illustrated in FIG. 1 and or the printing system 100 illustrated in FIG. 3, can reside in the system memory 506, and/or in the memory devices 508 and/or 510 in accordance with certain examples. The processing unit 504 executes one or more computer executable instructions originating from the system memory 506 and the memory devices 508 and 510. In such an example, the system memory 506 and/or the memory devices 508 and/or 510 could be employed, for example, to implement the memory 10 illustrated in FIG. 1 and/or the memory 102 illustrated in FIG. 3. The term "computer readable medium" as used herein refers to a medium that participates in providing instructions to the processing unit 504 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A network system for obtaining a network resource for printing comprising:
    a system comprising:
        a memory for storing computer executable instructions; and
        a processing unit for accessing the memory and executing the computer executable instructions, the computer executable instructions comprising:
            a server comprising a message analyzer to:
                receive a list of web pages based on a web search executed for query data in response to a query print message received at the server, wherein the query print message is one of a short message service (SMS) message and an email message, and the query print message comprises:
                    the query data;
                    a request identifier; and
                    a request for the web search and a print job based on the web search; and
                select a web page from the list of web pages based on the query print message to provide a selected web page;
            wherein the server is to manipulate the selected web page into a format for printing to provide a manipulated resource, wherein the manipulating comprises selecting a proper subset of content in the selected web page for printing.

2. The network system of claim 1, wherein the server is further to convert the manipulated resource into a set of commands for executing a print job.

3. The network system of claim 2, wherein the server provides the set of commands in an instruction message to a printer.

4. The network system of claim 1, wherein the query data includes data structured as a query for a search engine of the web.

5. The network system of claim 1, wherein the selected web page includes an advertisement and the server is further to remove the advertisement from the selected web page to provide the manipulated resource.

6. The network system of claim 1, wherein the selecting of the selected web page is based at least in part on a review of web searches similar to the web search executed for the query data in response to the query print message.

7. A method for obtaining a network resource for printing comprising:
    receiving a query print message,
        wherein the query print message is a short message service (SMS) message, the query print message comprises:
            query data;
            a request identifier; and
            a request for a web search and a print job based on the web search;
    selecting, from a list of web pages returned from the web search based on the query data, the web search being executed in response to the request for the web search in the query print message, a selected web page based on the query print message; and
    generating a command set based on the selected web page for a printer associated with a sender of the query print message in response to the request for the print job in the query print message.

8. The method of claim 7, further comprising manipulating the selected web page to provide the selected web page in a format suitable for printing.

9. The method of claim 8, wherein the manipulating comprises selecting a proper subset of content in the selected web page for printing.

10. The method of claim 7, wherein the selecting of the selected web page is based at least in part on a review of web searches similar to the web search executed for the query data in response to the request for the web search in the query print message.

11. A system for obtaining a network resource for printing comprising:
    a printing system coupled to a network, the printing system comprising:
        a memory for storing computer executable instructions; and
        a processing unit for accessing the memory and executing the computer executable instructions, the computer executable instructions comprising:
            a printer server comprising:
                an on ramp to receive a query print message from a client computer;
                a message analyzer to:
                    facilitate a web search in response to the query print message, the web search being based on query data included in the query print message, wherein the query print message is one of a short message service (SMS) message and an email message; and provide a selected web page from a list of web pages returned from the web search that has a highest likelihood of being a match for the query print message;
an off ramp to:
manipulate the selected web page into a format suitable for printing to provide a manipulated resource, wherein the manipulating comprises selecting a proper subset of content in the selected web page for printing;
generate a command set for a printer based on the manipulated resource; and
provide an instruction message that includes the command set to the printer;
wherein the query print message comprises a request for the web search and a print job based on the web search.

\* \* \* \* \*